(12) United States Patent
Keeler, Sr.

(10) Patent No.: US 8,445,046 B2
(45) Date of Patent: *May 21, 2013

(54) METHOD FOR PACKAGING CRABMEAT

(71) Applicant: John Keeler & Co., Inc., Miami, FL (US)

(72) Inventor: John Keeler, Sr., Carlsbad, CA (US)

(73) Assignee: John Keeler & Co., Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/681,027

(22) Filed: Nov. 19, 2012

(65) Prior Publication Data

US 2013/0078344 A1    Mar. 28, 2013

Related U.S. Application Data

(63) Continuation of application No. 10/691,480, filed on Oct. 21, 2003, now Pat. No. 8,337,922.

(51) Int. Cl.
*B65B 55/00* (2006.01)

(52) U.S. Cl.
USPC .................... 426/325; 426/126; 426/129

(58) Field of Classification Search
USPC .............................. 426/129, 324–326
See application file for complete search history.

(56) References Cited

U.S. PATENT DOCUMENTS

| | | | | |
|---|---|---|---|---|
| 2,546,428 A | * | 3/1951 | Byrd | 426/393 |
| 4,840,805 A | * | 6/1989 | Sugisawa et al. | 426/129 |
| 5,268,189 A | * | 12/1993 | Doerter | 426/573 |

* cited by examiner

*Primary Examiner* — Jyoti Chawla
(74) *Attorney, Agent, or Firm* — Walters & Wasylyna LLC

(57) ABSTRACT

A method for packaging crabmeat including the steps of providing a flexible pouch, placing a volume of crabmeat into the flexible pouch, controlling a volume of ambient air in the flexible pouch to obtain an ambient air to crabmeat ratio within the flexible pouch of about 13-20% by volume, sealing the flexible pouch to maintain the ambient air to crabmeat ratio within the flexible pouch, and pasteurizing the flexible pouch.

14 Claims, No Drawings

METHOD FOR PACKAGING CRABMEAT

PRIORITY

This application is a continuation of U.S. Ser. No. 10/691,480 (allowed) filed on Oct. 21, 2003, the entire contents of which are incorporated herein by reference.

BACKGROUND

The present invention relates generally to the packaging of crabmeat and, specifically, to a method for packaging crabmeat in flexible airtight containers. This method will allow packaging a successful marketable product while at the same time helping in slowing down spoilage and avoiding the undetected growth of anaerobic bacteria Traditionally, crabmeat products packaged in flexible airtight containers have been sterilized or frozen. Based on this invention, crabmeat will be packaged in flexible airtight containers, pasteurized, and offered to the consumer in a refrigerated state, rather than in a shelf stable, sterilized container or a frozen state. As is explained further in this text, sterilization or freezing alter the texture, taste, and in general, the fresh characteristics of the crabmeat.

Crabs are caught in the seawaters by fishermen and brought alive to the landing sites. Live crabs are then steam cooked or boiled in order to facilitate the picking process, which consists of the separation of the meat from the shell and other body parts. Cooked crabs are then ventilated to cool them and bring the temperature down to as close to ambient temperature before putting them in a temporary cooler or transferring them immediately to the picking room. In the picking room the crabs are cleaned and the different meats are picked. The meats may include jumbo lump, comprising the meat of the swimming legs; lump, comprising the muscle of the walking legs and big pieces of body meat; special, comprising the remaining body meat, most of which is shredded; claw, comprising dark meat from the claws; and cocktail claw, comprising meat from the claw attached to the moveable jaw of the claw. There are other varieties of these mentioned meat types including imperial, which is very large jumbo lump from bigger than normal crabs, super lump, which is only larger pieces of lump meat, and backfin, which is a mixture of lump and special meat pieces.

Once the different meats are picked, they are sorted by meat type and finally cleaned to remove any residual shell pieces that may have been attached to the meat and any other matter from the body or claws of the crab that are not intended for the consumer. The sorted and cleaned crabmeat is then packed, usually by hand, into the desired containers for packaging and pasteurization. Sealed containers waiting to be pasteurized are generally placed on ice or in ice water to maintain the holding meat cold and avoid excessive reproduction of bacteria that could render the pasteurization insufficient. Typical packaging vessels include metal cans, plastic cups, and flexible pouches. Once the containers are pasteurized, they are then placed in storage and packed for transportation and distribution to the customers.

In an atmospherically sealed metal can, the amount of air is quite abundant and therefore the danger of undetected anaerobic bacterial degradation is very unlikely. Typically one pound of crabmeat is packaged in a metal can with dimensions 401×301 or 4 1/16 inch diameter by 3 1/16 inch tall. This can has a volume capacity of about 650 ml. Assuming, in an effort to simplify, that crabmeat has a specific weight of 1, then one pound of crabmeat occupies 454 ml, the volume of free air left in the can is then 196 ml. Therefore, the air to meat ratio in the can is quite comfortable, such as about 43%.

Plastic airtight containers are also used to pack pasteurized crabmeat, similarly to metal cans. Except they may present several additional problems encountered during the pasteurization step of the packaging process. Common in the industry is the use of a plastic cup with an aluminum easy open lid. The volumetric capacity of a one pound plastic cup is about 515 ml. Simplifying again and assuming that one pound of crabmeat occupies 454 ml, we end up with only 61 ml of free air or an air to meat ratio of a little over 13%. The plastic cups inflate more during the heating cycle of pasteurization because they are less rigid than metal. The plastic to aluminum seal is not as strong as the metal-to-metal seal of the traditional metal can and air can escape through micro pores in the seam during the pasteurization process. As the pasteurized plastic containers are transferred to the cooling cycle, micropores close and the lost volume of air is not replaced. When the containers finally reach the storage temperature, the containers end up with an internal negative pressure due to the lost volume of air and the walls of the plastic containers are drawn inward. The misshapen containers cannot be sold to consumers, and therefore valuable product is lost. Plastic containers used according to the method of the present invention, however, have a controlled volume of air and a lower initial pressure going into the heating cycle of pasteurization. Therefore, it is less likely for air to escape during the pressure increase of the heating process. If air does not escape during the heating process, decrease in pressure will not occur within the can as the can cools and, therefore, the shape of the can will be maintained.

The risk with properly pasteurized products is temperature abuse. Temperature abuse occurs when the crabmeat product is taken out of refrigeration, whether at the kitchen, when purchased by a consumer, or during the shipping process, and is allowed to remain at temperatures favorable to the reproduction of bacteria to the level that would make the product unsafe for human consumption. Bacteria that survive pasteurization will reproduce and spores will hatch. With extended temperature abuse, the product will eventually spoil and because of the foul odor created by such spoilage it will serve as a warning to the consumer of the damage to the product. Spoilage bacteria require an aerobic atmosphere to reproduce and hatch. It would seem simple to avoid spoilage to just pack the crabmeat in an anaerobic atmosphere, like a vacuum. Unfortunately, however, bacteria also exist that reproduce in an anaerobic atmosphere.

One of the most troublesome anaerobic bacteria in the crabmeat industry is *Clostridium botulinum*. The toxins of *C. botulinum* can cause consumer illness (e.g., botulism) as well as death. The pasteurization process destroys most of the *C. botulinum* organisms, but its spores are much more difficult to destroy. Even though its presence in crabmeat is very unlikely, the potential exists and is thus addressed by the present invention.

SUMMARY

In light of the foregoing, the present invention provides a method for packaging crabmeat in flexible airtight containers by optimizing the amount of air in the container to reduce the harmful effects of aerobic and anaerobic bacterial growth. Aerobic bacteria require the presence of oxygen to reproduce. Anaerobic bacteria, however, can reproduce without air, under a vacuum, or in a modified atmosphere where air has been replaced by an inert gas.

Spoilage bacteria, which are aerobic, help consumers recognize the effects of temperature abuse because of the foul odor produced and in some cases the bloating and expanding of the container in which they are packaged. If there is no air in the package, then spoilage cannot occur. To the contrary, it is not possible for a consumer to detect the harmful effects of temperature abuse of crabmeat packaged in an anaerobic environment if anaerobic bacteria were originally present and survived the pasteurization process. Temperature abuse may have triggered reproduction of the anaerobic bacteria and the consumer will be fooled by the good smell of the meat, but will get ill after eating it.

At the same time, anaerobic bacteria will grow if there is little or no oxygen present. The presence of air in the container will slow down the reproduction of anaerobic bacteria or its spores that may be present.

In an embodiment of the present invention, a method for packaging crabmeat is provided that comprises the following steps: crabmeat is dispersed into a flexible pouch, the volume of air within the pouch is adjusted, the pouch is sealed, and the pouch is heat treated in a pasteurization process. After completing the pasteurization process, the pouch is allowed to cool to the proper storage temperature.

The reduced amount of air within the package still allows an aerobic environment. The limited amount of air, however, limits the amount of oxygen present to reduce the rate at which aerobic bacteria will grow and lead to spoilage of the product. The shelf life of the product is thereby prolonged, without losing the ability of spoilage bacteria to reproduce and warn the consumer should temperature abuse happen. Furthermore, the limited volume of air in the package is sufficiently small to prevent the package from excessively bloating during heating in the pasteurization process. Limiting the amount of air in the package also reduces the risk that the package seals might fail during pasteurization allowing contamination of the product.

The resulting packaged crabmeat retains many of its original qualities such as appearance, taste, texture, moisture, color, and smell. Furthermore, the packaged crabmeat has an extended shelf life and a sufficient aerobic environment to allow for slowing down the reproduction of anaerobic bacteria.

Other objects and advantages of the present invention will be apparent from the following description and the appended claims.

DETAILED DESCRIPTION

A method for packaging crabmeat is provided. According to an embodiment of the present invention, the method includes providing a vessel in which to disperse crabmeat, dispersing crabmeat in the vessel, adjusting the volume of air in the vessel to obtain a volume of air to volume of crabmeat ratio such that undetected anaerobic bacterial growth is prevented, sealing the packaging vessel, and pasteurizing the vessel.

In a first embodiment of the present invention, flexible pouches are used as the vessels in which the crabmeat is dispersed. Flexible pouches are typically made of a multi-layered film. The composition of the multi-layered film may be as follows: from the outside, a first layer of 12-micron polyethylene terephthalate (PET); a second layer of 15-micron nylon; a third layer of 9-micron aluminum foil; and a fourth layer of 100-micron cast polypropylene (CPP). Many variations of types of film and combinations are possible. The aluminum operates as an oxygen and light barrier helping in maintaining a longer shelf life.

When packaging crabmeat in flexible pouches that will be further subjected to heat treatment during pasteurization, the amount of air in the pouch is an important factor to control. If there is too much air in the pouch, the air will expand tremendously during the heating process and the pouch will inflate exposing it to high stresses that may jeopardize the integrity of the flexible pouch. Furthermore, the excess volume will call for more space in the pasteurization chamber and therefore minimize productivity. Furthermore, there is the risk that expanded flexible pouches may be forced by pressure to come into contact with the walls of the pasteurization unit and scratch its surface.

On the other hand, having flexible pouches with too little air, a vacuum, or a modified atmosphere where air is replaced with an inert gas is not a sensible option because of the anaerobic bacteria hazard discussed above.

The flexible pouch may have an air to meat ratio of up to 43% by volume. However, experiments with flexible pouches have shown that a desired volume of air to volume of meat ratio is about 20% by volume. This value is calculated by dividing the volume of free air space in the pouch by the volume of crabmeat placed in the pouch, as illustrated in the background section above. This amount will allow enough spoilage to occur after temperature abuse to prevent undetected anaerobic bacterial growth while yielding a manageable pouch during pasteurization and for selling to consumers. Lowering the levels of air too much below 13% may increase the possibility for undetected anaerobic bacterial growth, even though experimentation with flexible pouches have shown that ratios of air to meat as low as 6% have still allowed for spoilage to occur after temperature abuse. Air to meat ratios above 20% in flexible pouches, even though favorable to aerobic bacterial growth, are susceptible to the inflation problem discussed above. The experimental laboratory results for flexible pouches discussed above have been obtained using organoleptic and plate count tests at various air to meat ratios.

Although the present invention has been described using a flexible pouch, the use of other vessels in accordance with the present invention may become obvious to those skilled in the art. Such vessels may include metal cans, plastic cups, and the like. The present invention includes the method for packaging crabmeat using these vessels by optimizing the amount of air in the container to reducing the harmful effects of both aerobic and anaerobic bacterial growth.

The commercial implementation of the present invention utilizes partial vacuum to seal the flexible pouches. There are many adequate partial vacuum apparatus. The partial vacuum process should allow the packager to adjust the level of vacuum applied to the pouch, the time this vacuum pressure is applied, and the time the heating element of the sealing bar is applied to the pouch. These variations will result in an air to meat ratio within the package at a desired ratio upon the sealing of the package. In one such embodiment, the process utilizes the following conditions: a vacuum pressure chamber set to 0.045 mPa, a 1 second vacuum time, and 1.25 second sealing time. Any multitude of combinations of each of these parameters is possible to achieve the desired results.

The pasteurization step is a moderate heat process that destroys most bacteria and other spoilage organisms resulting in the extension of the refrigerated shelf life of the packaged product. The mildness of the heat process allows the product to maintain its fresh appearance, taste, texture, moisture, color and smell. Another process for treating packaged foods is sterilization. The sterilization process, however, is much more severe and virtually destroys all microorganisms and spores that could cause spoilage, but it would render the appearance and quality of the crabmeat unappealing. The pasteurization process, however, does not completely destroy all pathogens and its spores. Therefore, pasteurized products, unlike sterilized products, still require refrigeration and have only a limited shelf life compared to sterilized products.

The pasteurization step of the present invention is directed to destroying pathogenic microorganisms and spores while maintaining the fresh appearance and texture of the crabmeat product. Pasteurization times and temperatures vary depending on the vessel type, initial crabmeat temperature, as well as many other variables. In an embodiment of the present invention, a pasteurization time of about 80 to 160 minutes at a temperature of about 185 to 189° F. is used for crabmeat packaged in a flexible pouch. A pasteurization time of 120 to 140 minutes at a temperature of about 188 to 192° F. may be used for crabmeat packaged in a metal can. A pasteurization time of approximately 160 minutes at a temperature of about 182 to 184° F. may be used for crabmeat packaged in a plastic container.

Although this invention is shown and described with respect to certain embodiments, it is obvious that equivalents and modifications will occur to those skilled in the art upon reading and understanding this specification and claims. The present invention includes all such equivalents and modifications and is limited only by the scope of the claims.

What is claimed is:

1. A method for packaging crabmeat comprising the steps of:
   providing a flexible pouch, wherein said flexible pouch comprises a multi-layer film;
   placing a volume of crabmeat into said flexible pouch;
   after said crabmeat has been placed into said flexible pouch, controlling a volume of ambient air in said flexible pouch to obtain an ambient air to crabmeat ratio within said flexible pouch of about 13-20% by volume;
   sealing said flexible pouch to maintain said ambient air to crabmeat ratio within said flexible pouch, wherein said sealing step includes the use of a partial vacuum; and
   after said sealing step, pasteurizing said flexible pouch.

2. The method of claim 1 wherein said flexible pouch comprises an oxygen barrier.

3. The method of claim 1 wherein said multi-layer film comprises:
   at least one layer of polyethylene terephthalate;
   at least one layer of nylon;
   at least one layer of aluminum; and
   at least one layer of cast polypropylene.

4. The method of claim 1 wherein said air to crabmeat ratio is about 20% by volume.

5. The method of claim 1 wherein said pasteurizing step is performed for about 80 to about 160 minutes.

6. The method of claim 5 wherein said pasteurizing step is performed at a temperature of about 185 to about 189° F.

7. The method of claim 1 further comprising the step of maintaining said pasteurized flexible pouch under refrigeration.

8. A packaged crabmeat product consisting essentially of:
   a sealed flexible pouch, wherein said flexible pouch comprises a multi-layer film;
   a volume of crabmeat positioned in said sealed flexible pouch; and
   a volume of ambient air positioned in said sealed flexible pouch, said volume of ambient air providing an ambient air to crabmeat ratio within said sealed flexible pouch of about 13-20% by volume,
   wherein said flexible pouch is sealed using a partial vacuum, and
   wherein said sealed flexible pouch is pasteurized.

9. The packaged crabmeat product of claim 8 wherein said flexible pouch comprises an oxygen barrier.

10. The packaged crabmeat product of claim 8 wherein said multi-layer film comprises:
    at least one layer of polyethylene terephthalate;
    at least one layer of nylon;
    at least one layer of aluminum; and
    at least one layer of cast polypropylene.

11. The packaged crabmeat product of claim 8 wherein said air to crabmeat ratio is about 20% by volume.

12. The packaged crabmeat product of claim 8 wherein said sealed flexible pouch is pasteurized for about 80 to about 160 minutes.

13. The packaged crabmeat product of claim 12 wherein said sealed flexible pouch is pasteurized at a temperature of about 185 to about 189° F.

14. The packaged crabmeat product of claim 8 wherein said pasteurized, sealed flexible pouch is maintained under refrigeration.

* * * * *